US011423068B2

United States Patent
Faruqui et al.

(10) Patent No.: US 11,423,068 B2
(45) Date of Patent: Aug. 23, 2022

(54) CANONICALIZING SEARCH QUERIES TO NATURAL LANGUAGE QUESTIONS

(71) Applicant: Google LLC, Mountain View, CA (US)

(72) Inventors: Manaal Faruqui, Brooklyn, NY (US); Dipanjan Das, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 141 days.

(21) Appl. No.: 16/251,447

(22) Filed: Jan. 18, 2019

(65) Prior Publication Data

US 2020/0167379 A1     May 28, 2020

Related U.S. Application Data

(60) Provisional application No. 62/771,686, filed on Nov. 27, 2018.

(51) Int. Cl.
    *G06F 16/33*     (2019.01)
    *G06K 9/62*     (2022.01)
    *G06N 3/04*     (2006.01)
    *G06F 40/232*     (2020.01)

(52) U.S. Cl.
    CPC ........ *G06F 16/3344* (2019.01); *G06F 40/232* (2020.01); *G06K 9/6267* (2013.01); *G06N 3/04* (2013.01)

(58) Field of Classification Search
    CPC . G06F 16/3344; G06F 40/232; G06K 9/6267; G06N 3/04
    USPC ......................................................... 707/769
    See application file for complete search history.

(56) References Cited

U.S. PATENT DOCUMENTS

| | | | |
|---|---|---|---|
| 6,401,084 B1 * | 6/2002 | Ortega .................. | G06F 40/226 707/999.005 |
| 9,195,706 B1 * | 11/2015 | Finkelstein ......... | G06F 16/3322 |
| 9,396,263 B1 * | 7/2016 | Unger ................... | G06F 16/951 |
| 9,536,522 B1 * | 1/2017 | Hall ..................... | G06F 16/3344 |
| 10,120,858 B2 * | 11/2018 | Yannam ................ | G06F 40/253 |
| 2002/0128819 A1 * | 9/2002 | Jessee ................... | G06F 40/253 704/10 |

(Continued)

FOREIGN PATENT DOCUMENTS

WO     WO-2017181834 A1 * 10/2017

OTHER PUBLICATIONS

Movin, Maria, "Spelling Correction in a Music Entity Search Engine by Learning from Historical Search Queries", Jun. 5, 2018 (Year: 2018).*

(Continued)

*Primary Examiner* — Hosain T Alam
*Assistant Examiner* — Robert F May
(74) *Attorney, Agent, or Firm* — Middleton Reutlinger

(57) ABSTRACT

Techniques are described herein for training and/or utilizing a query canonicalization system. In various implementations, a query canonicalization system can include a classification model and a canonicalization model. A classification model can be used to determine if a search query is well-formed. Additionally or alternatively, a canonicalization model can be used to determine a well-formed variant of a search query in response to determining a search query is not well-formed. In various implementations, a canonicalization model portion of a query canonicalization system can be a sequence to sequence model.

20 Claims, 11 Drawing Sheets

(56) References Cited

U.S. PATENT DOCUMENTS

| | | | | |
|---|---|---|---|---|
| 2003/0036900 | A1* | 2/2003 | Weise | G06F 40/253 704/9 |
| 2010/0180198 | A1* | 7/2010 | Iakobashvili | G06F 40/232 715/257 |
| 2012/0233140 | A1* | 9/2012 | Collins-Thompson | G06F 16/3338 707/706 |
| 2015/0039536 | A1* | 2/2015 | Cook | G06F 16/24575 706/11 |
| 2015/0261849 | A1* | 9/2015 | Chu-Carroll | G06F 40/289 707/723 |
| 2017/0286401 | A1* | 10/2017 | He | G06F 16/3344 |
| 2019/0355270 | A1* | 11/2019 | McCann | G06N 3/082 |

OTHER PUBLICATIONS

Faruqui, Manaal et al. "Identifying Well-formed Natural Language Questions," arXiv preprint arXiv:1808.09419, 2018—arxiv.org, Aug. 28, 2018, 6 pages.

Ling, Wang et al. "Latent Predictor Networks for Code Generation," arXiv preprint arXiv:1603.06744, 2016—arxiv.org, Jun. 8, 2016, 11 pages.

Sutskever, Ilya et al. "Sequence to Sequence Learning with Neural Networks," Advances in Neural Information Processing Systems 27 (NIPS 2014), Dec. 14, 2014, 9 pages.

VanderWende, Lucy et al. "The Importance of Being Important: Question Generation," In Proceedings of the Workshop on the Question Generation Shared Task and Evaluation Challenge, pdfs. semanticscholar.org, 2008, 2 pages.

Baeza-Yates, Ricardo et al. "The Intention Behind Web Queries," String Processing and Information Retrieval. (SPIRE 2006). Lecture Notes in Computer Science, vol. 4209. Springer, Berlin, Heidelberg, pp. 98-109.

Fader, Anthony et al. "25,100 queries from the Paralex corpus," GitHub, 2013, Retrieved on Oct. 11, 2018, 2 pages.

Bahdanau, Dzmitry et al. "Neural Machine Translation By Jointly Learning To Align And Translate," arXiv preprint arXiv:1409.0473, 2014—arxiv.org, ICLR 2015, May 19, 2016, 15 pages.

Du, Xinya et al. "Learning to Ask: Neural Question Generation for Reading Comprehension," arXiv preprint arXiv:1409.0473, 2014—arxiv.org, Aug. 29, 2017, 11 pages.

Heilman, Michael et al. "Good Question! Statistical Ranking for Question Generation," HLT '10 Human Language Technologies: The 2010 Annual Conference of the North American Chapter of the Association for Computational Linguistics, pp. 609-617, Jun. 2-4, 2010.

Alberti, Chris et al. "Improved Transition-Based Parsing and Tagging with Neural Networks," Proceedings of the 2015 Conference on Empirical Methods in Natural Language Processing, Lisbon, Portugal, Sep. 17-21, 2015, pp. 1354-1359.

* cited by examiner

CANONICALIZING SEARCH QUERIES TO NATURAL LANGUAGE QUESTIONS

BACKGROUND

Rules-based rewrites of search queries have been utilized in query processing components of search systems. For example, some rules-based rewrites may generate a rewrite of a query by removing certain stop words from the query, such as "the", "a", etc. The rewritten query may then be submitted to the search system and search results returned that are responsive to the rewritten query.

Further, collections of similar queries have been utilized in search systems to, for example, recommend additional queries that are related to a submitted query (e.g., "people also search for X"). Similar queries to a given query are often determined by navigational clustering. For example, for the query "funny cat pictures", a similar query of "funny cat pictures with captions" may be determined based on that similar query being frequently submitted by users following submission of "funny cat pictures".

SUMMARY

Techniques described herein are directed to processing a natural language search query to determine whether the natural language search query is well-formed, and if not, utilizing a trained canonicalization model to generate a well-formed variant of the natural language search query. Well-formedness is an indication of how well a word, a phrase, and/or other additional linguistic element(s) conform to the grammar rules of a particular language. In many implementations, a well-formed question is grammatically correct, does not contain spelling errors, and is an explicit question. For example, "What are directions to Hypothetical Café?" is an example of a well-formed variant of the natural language query "Hypothetical Café directions". As described in more detail herein, in various implementations whether a query is well-formed can be deterministically determined using a trained classification model and/or a well-formed variant of a query can be deterministically generated using a trained canonicalization model.

In response to receiving a user-formulated search query from a client device, some implementations disclosed herein can determine if the search query is well-formed by processing features of the search query using a trained classification model. In some of those implementations, one or more features of the search query can be applied to the classification model as input, and processed using the classification model to generate a measure that indicates whether the search query is well-formed. Features of the search query can include, for example, character(s), word(s), part(s) of speech, entities included in the search query, and/or other linguistic representation(s) of the search query (such as word n-grams, character bag of words, etc.). The classification model is a machine learning model, such as a neural network model that contains one or more layers such as one or more feed-forward layers, softmax layer(s), and/or additional neural network layers. For example, the classification model can include several feed-forward layers utilized to generate feed-forward output. The resulting feed-forward output can be applied to softmax layer(s) to generate a measure (e.g., a probability) that indicates whether the search query is well-formed.

When it is determined that the search query is not a well-formed query, a trained canonicalization model is utilized to generate a well-formed variant of the search query. For example, the search query, feature(s) extracted from the search query, and/or additional input can be processed using the canonicalization model to generate a well-formed variant correlating with the search query.

In some implementations, the canonicalization model is a neural network model, such as a recurrent neural network (RNN) model that includes one or more memory layers. A memory layer includes one or more recurrent neural network (RNN) units, such as a long short-term memory (LSTM) unit and/or a gated recurrent unit (GRU). In some implementations where the canonicalization model is an RNN model with memory layers, the canonicalization model is a sequence to sequence model. For example, the sequence to sequence model can be one where features of a search query can be applied as input to the model, and an encoding of the features can be generated over layers of the network. Further, the generated encoding can be decoded over additional layers of the network, where the resulting decoding indicates (directly or indirectly) a well-formed variant of the query.

Query canonicalization systems in accordance with many implementations described herein generate a well-formed variant of the search query only after a determination is made that the search query is not well-formed, thus conserving resources of a client device and/or a server device by only selectively generating the well-formed variant. For example, if a user submits a well-formed search query, query canonicalization systems can determine the search query is well-formed using a classification model (which can be more computationally efficient than a canonicalization model), and utilize the well-formed search query in performing a search and without attempting to generate a well-formed variant using a canonicalization model. In other words, if the query canonicalization system determines a search query is well-formed, the system does not generate a well-formed variant using a canonicalization model.

Additionally or alternatively, implementations described herein can determine one or more related queries for a given search query. For example, a related query for a given query can be determined based on the related query being frequently submitted by users following the submission of the given search query. In some such implementations, the query canonicalization system can determine if the related query is well-formed, and if not, determine a well-formed variant of the related query. Such a well-formed variant of the related query can be presented, in lieu of the related query, responsive to submission of the given search query. For example, in response to submission of the given search query, a selectable version of the well-formed variant can be presented along with search results for the given query and, if selected, the well-formed variant (or the related query itself in some implementations) can be submitted as a search query and results for the well-formed variant (or the related query) then presented. By providing users of query canonicalization systems with a well-formed variant of a related query, instead of the related query itself, a user can more easily and/or more quickly understand the intent of the related query. Such efficient understanding enables the user to quickly submit the well-formed variant to quickly discover additional information (i.e., result(s) for the related query or well-formed variant) in performing a task and/or enables the user to only submit such query when the intent indicates likely relevant additional information in performing the task. Quick and/or selective submission of related queries can conserve client device and/or server resources in conducting searches related to performing the task.

As one example, the system can determine the phrase "hypothetical router configuration" is related to the query "reset hypothetical router" based on historical data indicating the two queries are submitted proximate (in time and/or order) to one another by a large quantity of users of a search system. In some implementations, the query canonicalization system can determine the related query "reset hypothetical router" is not a well-formed query, and can determine a well-formed variant of the related query, such as: "how to reset hypothetical router". The well-formed variant "how to reset hypothetical router" can then be associated, in a database, as a related query for "hypothetical router configuration"—and can optionally supplant any related query association between "reset hypothetical router" and "hypothetical router configuration". Subsequent to such association, in response to receiving "hypothetical router configuration" as a search query submitted by a user, a client device can be caused to render (e.g., audibly and/or graphically) the well-formed variant of "how to reset hypothetical router". In some of those implementations, the well-formed variant of the related query is a selectable link that, when selected, causes submission of the well-formed variant (or of the original related query in some implementation) and corresponding search results to be determined and displayed in response.

The above description is provided as an overview of various implementations disclosed herein. Those various implementations, as well as additional implementations, are described in more detail herein.

In some implementations, a method implemented by one or more processors is provided that includes receiving a search query, the search query being a natural language search query and being generated at a client device responsive to user interface input received at the client device. The method further includes determining whether the search query is well-formed, where determining whether the search query is well-formed includes processing features of the search query using a trained classification model to generate classification output, and determining whether the search query is well-formed based on the classification output. The method further includes, in response to determining the search query is not well-formed, generating a well-formed variant of the search query, where generating the well-formed variant includes applying features of the search query as input to an encoder portion of a trained canonicalization model to generate encoder output, and applying the encoder output to a decoder portion of the trained canonicalization model to generate the well-formed variant of the search query. The method further includes providing the well-formed variant to a search system to generate one or more search results corresponding to the well-formed variant. The method further includes causing, responsive to receiving the search query, the one or more search results, that correspond to the well-formed variant, to be rendered via the client device.

These and other implementations of the technology disclosed herein can include one or more or the following features.

In some implementations, the well-formed variant of the search query is grammatical, is an explicit question, and contains no spelling errors.

In some implementations, the features of the search query comprise one or more of: one or more characters in the search query, one or more words in the search query, or one or more parts of speech in the search query. In some versions of those implementations, the linguistic characteristics comprise one or more of: one or more character n-grams, one or more word n-grams, or one or more part of speech n-grams. In some versions of those implementations, applying the search query as input to the encoder portion of the trained canonicalization model includes applying a concatenation of multiple of: the one or more character n-grams, the one or more word n-grams, or the one or more part of speech n-grams. In some versions of those implementations, processing the features of the search query of the trained classification model to generate classification output comprises applying the concatenation to a plurality of feed-forward layers of the trained classification model to generate feed-forward output. In some versions of those implementations, processing the features of the search query of the trained classification model to generate classification output further includes applying the feed-forward output as input to a softmax layer of the trained classification model to generate the classification output. In some versions of those implementations, the classification output is a value between zero and one, wherein a magnitude of the value indicates whether the search query is well-formed.

In some implementations, the trained canonicalization model is a sequence to sequence model, wherein the encoder portion of the canonicalization model is a first recurrent neural network and the decoder portion of the canonicalization model is a second recurrent neural network. In some versions of those implementations, the canonicalization model is trained by: training the canonicalization model based on a plurality of canonicalization training instances that each includes a corresponding first query which is not well-formed and a corresponding second query which is well-formed. In some versions of those implementations, the classification model is trained by: training the classification model based on a plurality of classification training instances that each includes a corresponding input query and a corresponding indication of whether the corresponding input query is well-formed. In some versions of those implementations, the search system is remote from the client device and providing the well-formed variant to the search system to generate the one or more search results corresponding to the well-formed variant includes: transmitting the well-formed variant to the search system remote from the client device, and receiving the one or more search results from the search system remote from the client device.

In some implementations, a method implemented by one or more processors is provided that includes receiving a search query, the search query being a natural language search query and being generated at a client device responsive to user interface input received at the client device. The method further includes determining whether the search query is well-formed, where determining whether the search query is well-formed includes: processing features of the search query using a trained classification model to generate classification output, and determining whether the search query is well-formed based on the classification output. The method further includes, in response to determining the search query is not-well formed, generating a well-formed variant of the search query, where generating the well-formed variant includes: applying features of the search query as input to an encoder portion of a trained canonicalization model to generate encoder output, applying the encoder output to a decoder portion of the trained canonicalization model to generate the well-formed variant of the search query, and causing, responsive to receiving the search query, the client device to render: an indication the search query is not well-formed, and the well-formed variant.

These and other implementations of the technology disclosed herein can include one or more of the following features.

In some implementations, causing the indication the search query is not well-formed to be rendered comprises causing the indication the search query is not well-formed to be rendered, via a display, as a selectable link. In some versions of those implementations, in response to receiving user interface input at the client device indicating a selection of the selectable link, providing the well-formed variant to a search system to generate one or more search results corresponding to the well-formed variant, and causing, responsive to the well-formed variant, the one or more search results to be rendered via the client device.

In some implementations, the trained canonicalization model is a sequence to sequence model, where the encoder portion of the canonicalization model is a first recurrent neural network and the decoder portion of the trained canonicalization model is a second recurrent neural network.

In some implementations, a method implemented by one or more processors is provided that includes determining a related search query for a given search query. The method further includes determining whether the related search query is well-formed, where determining whether the related search query is well-formed includes: processing features of the related search query using a trained classification model to generate classification output, and determining whether the related search query is well-formed based on the classification output. The method further includes, in response to determining the related search query is not well-formed, generating a well-formed variant of the related search query, where generating the well-formed variant includes: applying the related search query as input to an encoder portion of a trained canonicalization model to generate the encoder output, and applying the encoder output to a decoder portion of the trained canonicalization model to generate the well-formed variant of the related search query. The method further includes defining a mapping between the search query and the well-formed variant of the related search query. The method further includes, subsequent to defining the mapping, and in response to a submission of the search query via a client device: determining to provide a selectable version of the well-formed variant for presentation in response to the submission, based on the mapping being defined between the search query and the well-formed variant, and causing, in response to the submission, the client device to visually render the selectable version of the well-formed variant. The method further includes, in response to selection, via the client device, of the selectable version of the well-formed variant, providing the related search query to a search system to generate one or more corresponding search results.

These and other implementations of the technology disclosed herein can include one or more of the following features.

In some implementations, the well-formed variant of the related search query is grammatical, is an explicit question, and contains no spelling errors.

In some implementations, the trained canonicalization model is a sequence to sequence model, wherein the encoder portion of the canonicalization model is a first recurrent neural network and the decoder portion of the canonicalization model is a second recurrent neural network.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
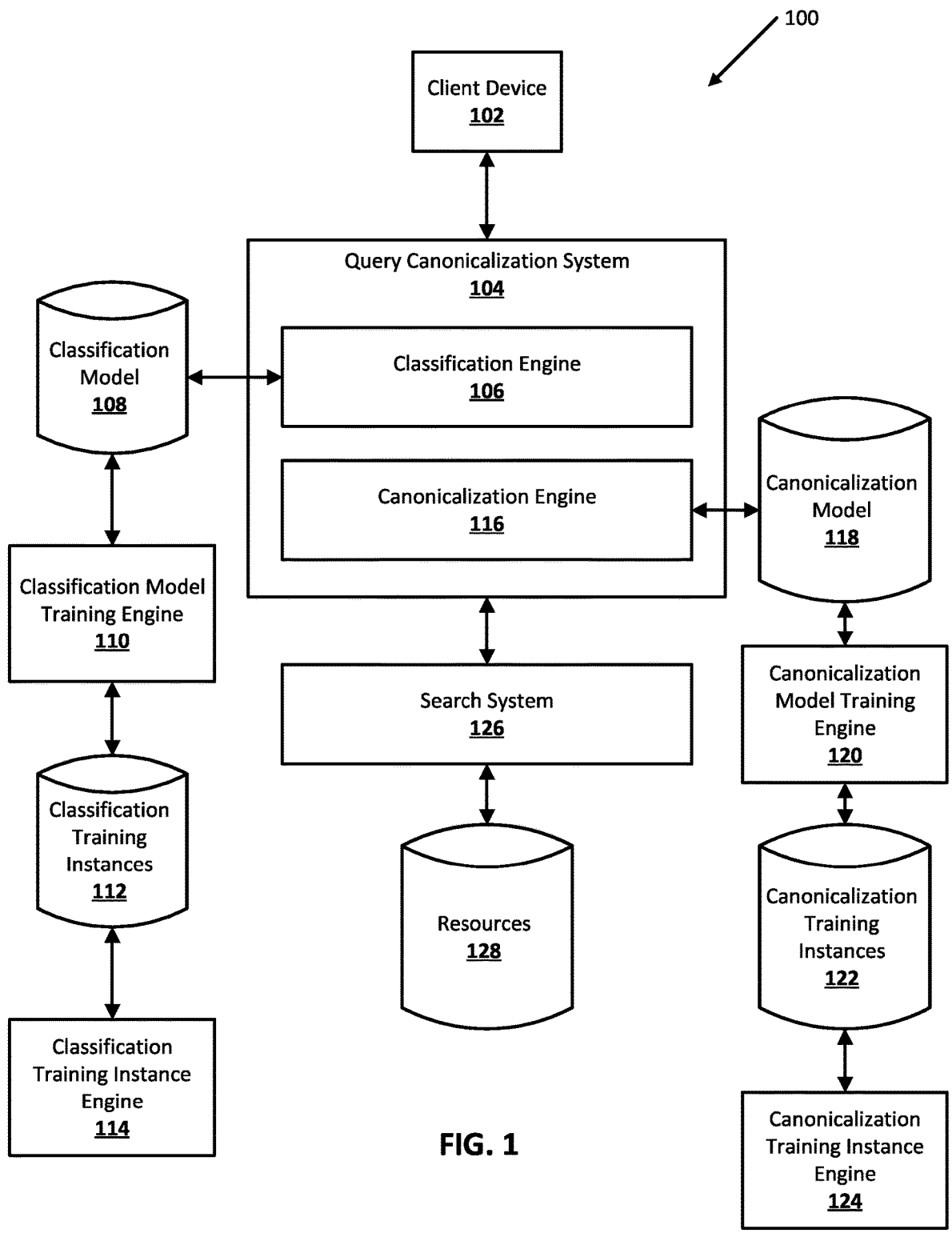
FIG. 1 is a block diagram of an example environment in which implementations disclosed herein may be implemented.

FIG. 1 illustrates an example environment in which implementations disclosed herein may be implemented. The example environment of FIG. 1 includes a client device 102, a query canonicalization system 104, a search system 128, a classification model training engine 110, a classification training instance engine 114, a canonicalization model training engine 120, and a canonicalization training instance engine 124. Such systems and engines may each be implemented in one or more computing devices that communicate, for example, through a communication network. A communication network may include a wide area network (WAN) such as the Internet, one or more intranets, and/or one or more bus subsystems. A communication network may optionally utilize one or more standard communications technologies, protocols, and/or interprocess communication techniques.

Query canonicalization system 104, search system 126, classification model training engine 110, classification training instance engine 114, canonicalization model training engine 120, and canonicalization training instance engine 124 are example components in which techniques described herein may be implemented and/or with which systems, components, and techniques described herein may interface.

The operations performed by one or more of the systems 104, 126 and engines 110, 114, 120, 124 of FIG. 1 may be distributed across multiple computer systems. In some implementations, one or more aspects of the systems 104, 126 and engines 110, 114, 120, 124 may be combined in a single system and/or one or more aspects may be implemented on the client device 102. For example, in some of those implementations, aspects of query canonicalization system 104 may be combined with aspects of search system 126.

A user of client device 102 can formulate a search query via client device 102 by providing user interface input via one or more user interface input devices of the client device 102. The client device 102 submits the query to the query canonicalization system 104. In some situations, the query is in a textual form. In other situations, the query can be submitted in an audio and/or other form, and converted by the query canonicalization system 104 (or other components such as a voice-to-text engine) to a textual form.

For a received search query, the query canonicalization system 104 generates a well-formed variant of the search query, and causes output to be provided to client device 102, where the output is based on the well-formed variant. In some implementations, a search query and a well-formed variant of the search query can have the same intent. Two search queries have the same intent if they have the same objective and/or goal. For example, "age jaane doe", "jane doe age" "how old jane doe", and "how old is Jane Doe" all have the same intent. In some implementations, the output provided by the query canonicalization system 104 includes the well-formed variant to be provided as a suggested alternative for consideration by the user. In some implementations, the output additionally or alternatively includes content that is based on one or more responses, from search system 126, where the response(s) are based on submission of the well-formed variant of the search query to the search system 126. The search system 126 can determine responses based on access of one or more resources 128 and can utilize various techniques, such as one or more information retrieval techniques. The content that is based on a response can be, for example, graphical and/or audible "answers" or other search results that is based on (e.g., a snippet of) the response.

In some implementations, for a received search query search system 126 can additionally or alternatively determine a well-formed variant of a related search query for the received search query, and cause the well-formed variant (e.g., a selectable version thereof) to be presented responsive to the received search query. In many implementations, the search system 126 can determine a pair of queries is related based on historical data indicating the two queries are submitted proximate (in time and/or order) to one another by a large quantity of users of a search system. A related query for the given search query can be submitted to the query canonicalization system 104 to generate a well-formed variant of the related query, and the well-formed variant of the related query presented responsive to the given search query (e.g., in lieu of the related query itself). In various implementations, a mapping between the given search query and the well-formed variant of the related search query (and/or the related search query itself) can be pre-determined prior to receiving the given search query to decrease latency of providing the well-formed variant responsive to receiving the given search query.

Where content that is based on response(s) is provided, the query canonicalization system 104 can provide the content to the client device 102 directly, or can cause the search system 126 to provide the content to the client device 102. In some implementations, the query canonicalization system 104 and the search system 126 may optionally be controlled by the same party and/or work in concert with one another. Additional and/or alternative output can be provided based on generated well-formed variants of the search query, such as an advertisement that is assigned to a generated well-formed query in one or more databases.

In FIG. 1, query canonicalization system 104 includes a classification engine 106 and a canonicalization engine 116. In some implementations, one or more aspects of classification engine 106 and canonicalization engine 116 may be combined and/or implemented in a component that is separate from query canonicalization system 104, such as client device 102.

Classification engine 106 utilizes a trained classification model 108 to generate a measure (e.g., a probability, a binary value, and/or additional measure(s)) which indicates if a submitted search query is well-formed. In some implementations, the classification engine 106 includes one or more CPUs, GPUs, and/or TPUs that operate over the trained classification model 108. The classification engine 106 generates the measure which indicates if a submitted query is well-formed by applying one or more linguistic features of the search query as input to the classification model 108 (and/or as input to canonicalization model 118). A search query can be divided into one or more linguistic representations such as characters, words, parts of speech, phonemes, syllables, and/or additional linguistic representations. In many implementations, linguistic features can be represented in a variety of ways including bag of words, n-grams, and/or additional representations of linguistic features. For example, character n-grams of varying sizes (i.e., a continuous sequence of n items from the search query) can be extracted as linguistic features to apply as input to classification model 108 and/or to canonicalization model 118. For example, n-grams can represent one, two, three, four, five, and/or additional contiguous sequences of linguistic features. As a further example, the search query "What is today's date?" can be represented as word three-grams as (1) What is today's (2) is today's date. Combinations of features can be concatenated and provided as input to the first layer of classification model 108 and/or canonicalization model 118. Additionally or alternatively, several types of linguistic features can be concatenated and applied to the first feed-forward layer of the classification model as input. For example, word n-grams, character n-grams and part of speech n-grams can be concatenated and applied as input to the classification model. Additionally or alternatively, varying combinations of linguistic feature representations can be concatenated. As a further example, the input can include a concatenation of word 1-grams, word 2-grams, part of speech 1-grams, part of speech 2-grams, part of speech 3-grams and/or additional linguistic feature representations.

Also illustrated in FIG. 1 are classification model training engine 110 and classification training instance engine 114. The classification training instance engine 114 generates classification training instances. In some implementations, classification training instance engine 114 stores the classification training instances in a classification training instance database 112. The classification model training engine 110 trains the classification model 108 based on training instances generated by classification training instance engine 114. Additional description of implementations of engines 110, 114 is provided below in description related to FIG. 2.

Canonicalization engine 116 utilizes a trained canonicalization model 118 to generate a well-formed variant of a search query. In some implementations, the canonicalization engine 116 includes one or more CPUs, GPUs, and/or TPUs that operate over the trained canonicalization model 118. The canonicalization engine 116 generates a well-formed variant of a search query by applying the search query as input to canonicalization model 118. The same linguistic features of the search query applied as input to classification model 108 can optionally be applied as input to canonicalization model 118. In many implementations, additional or alternative linguistic features (relative to the linguistic features applied as input to classification model 108) can be applied as input to canonicalization model 118.

FIG. 1 also illustrates canonicalization model training engine 120 and canonicalization training instance engine 124. Canonicalization training instance engine 124 generates canonicalization training instances and, in some implementations, stores the canonicalization training instances in canonicalization training instance database 122. The canonicalization model training engine 120 trains the canonicalization model 118 based on the canonicalization training instances. Additional description of implementations of engines 120, 124 is provided below in description related to FIG. 3.

Figure 2:
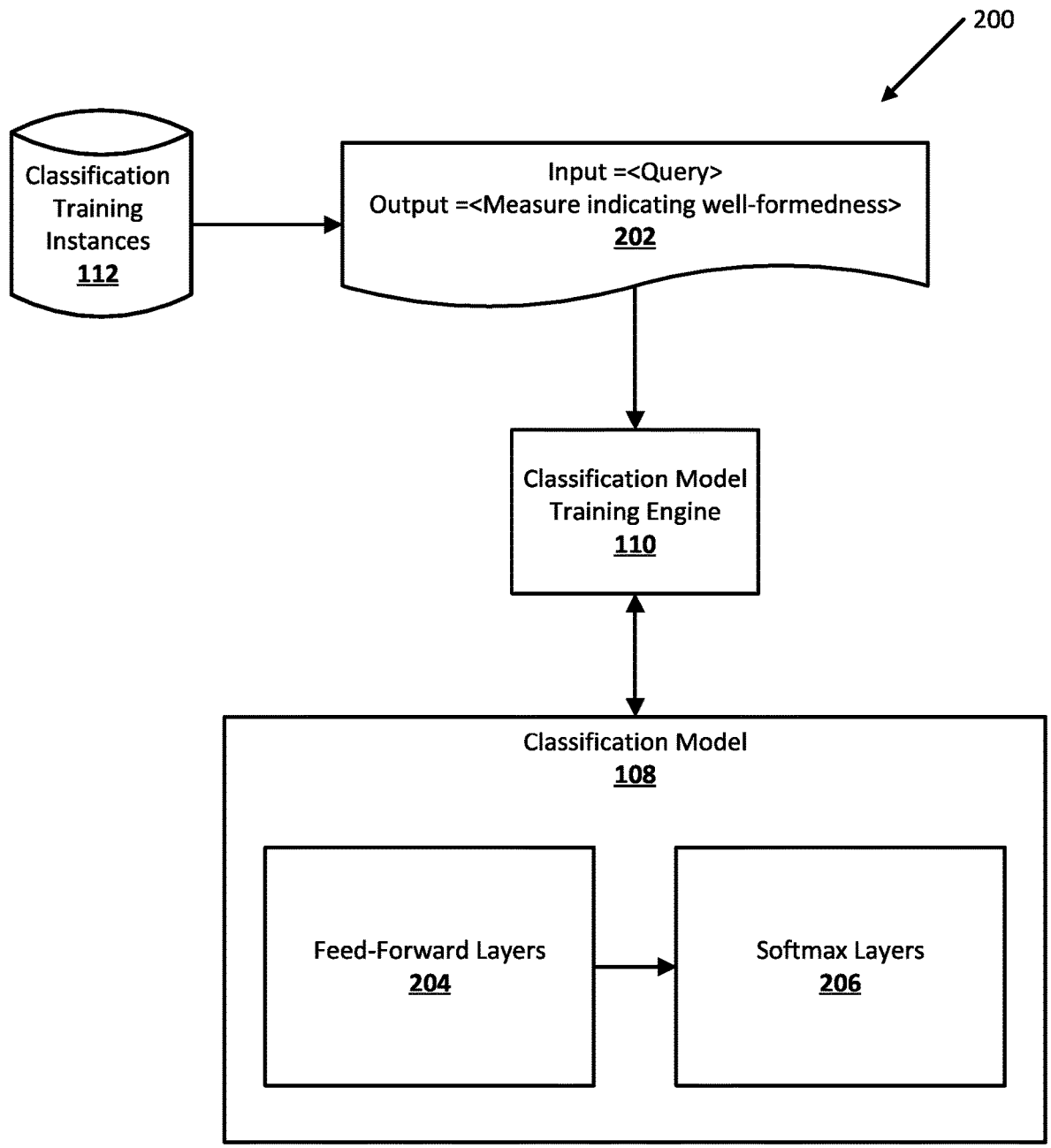
FIG. 2 illustrates an example of training a classification model according to implementations disclosed herein.

Turning to FIG. 2, an example is illustrated of training classification model 108. A classification training instance 202 is retrieved from the classification training instance database 112. The classification training instance 202 can be generated by the classification training instance engine 114 (FIG. 1) based on, for example, a query previously submitted by a user and a measure indicating if that query is well-formed (or not). In some implementations, the measure indicating if the query is well-formed can be provided by one or more human reviewers utilizing respective computing devices. As one example, a classification training instance can include the query "age Jane Doe" and the measure indicating if the query is well-formed is a binary value 0 (i.e., the value 0 indicating the query "age Jane Doe" is not well-formed). As another example, a classification training instance can include the query "How old is John Doe" and the measure indicating if the query is well-formed is a binary value 1 (i.e., the value 1 indicating the query "How old is John Doe" is well-formed). Additional or alternative values can be utilized in training instances to indicate whether a query is well-formed such as values of "0", "1", and value(s) between "0" and "1" (with value(s) closer to "1" indicating a greater degree of well-formedness and value(s) closer to "0" indicating a lesser degree of well-formedness).

The classification model training engine 110 applies the query portion of the classification training instance as input to the classification model 108. The classification model training engine 110 further generates output over the classification model 108 based on the applied input and the current learned parameters of the classification model 108. The classification model training engine 110 further generates a gradient based on comparison of the generated output to the training instance output of the classification training instance 202 (e.g., a measure indicating the if the query portion of the training instance is well-formed), and updates the classification model 108 based on the gradient (e.g., backpropagates the gradient over the entire classification model 108). Batch training techniques can additionally or alternatively be utilized in which the gradient is generated based on comparisons of generated outputs, for multiple training instances, to training instance outputs for the multiple training instances.

In generating the output based on the applied input, the classification model training engine 110 can apply all or portions of the input to one or more feed-forward layer(s) 204 of classification model 108 to generate feed-forward output. For example, linguistic features of the query can be applied as input to feed-forward layers 204 of the classification model 108. The classification model training engine 110 can then apply the generated feed-forward output to softmax layer(s) 206 and generate output over the softmax layers 206 based on the application of the generated feed-forward output. Although FIG. 2 illustrates only a single training instance 202, it is understood that many additional training instances will be utilized in training classification model 108.

Figure 3:
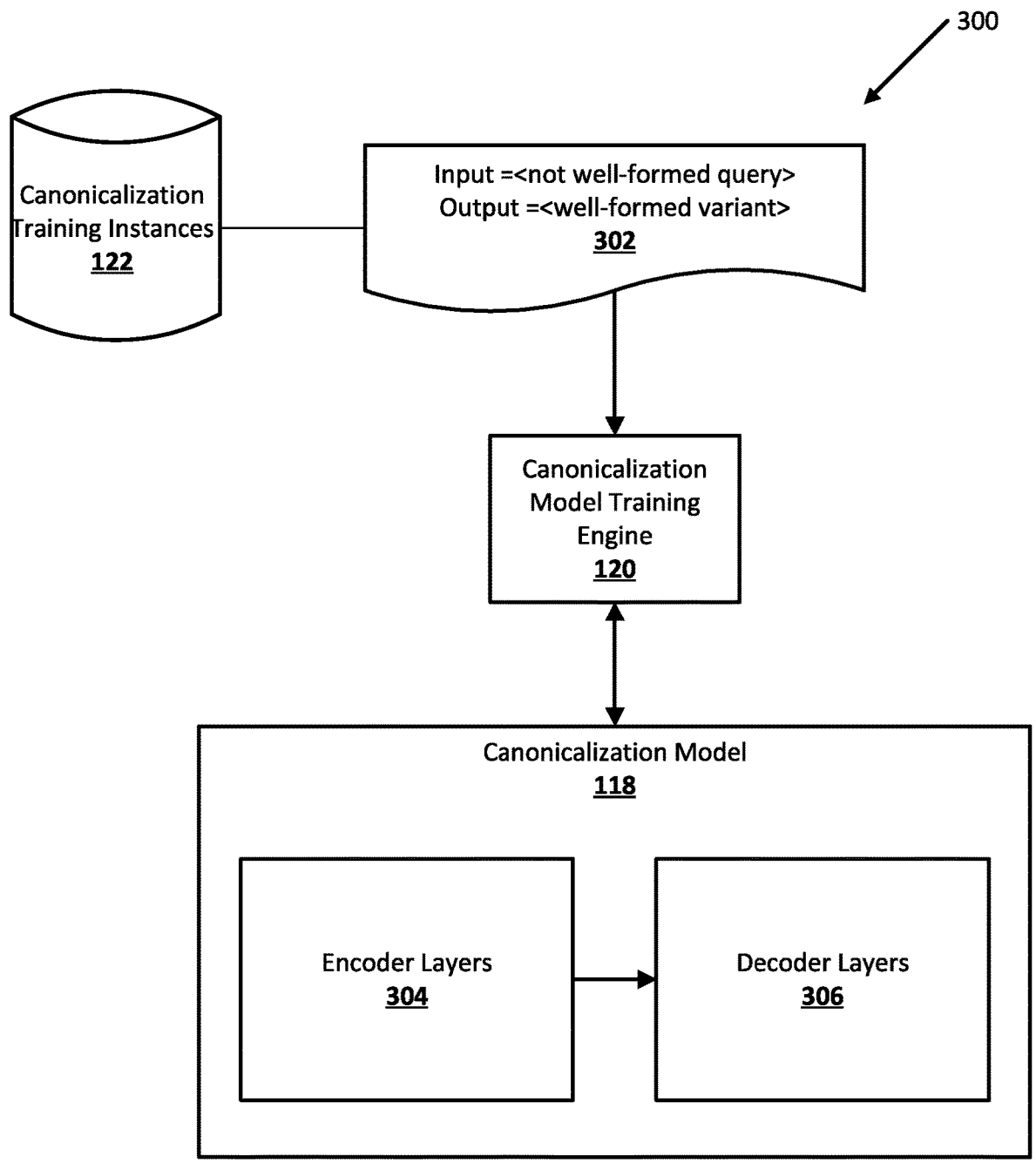
FIG. 3 illustrates an example of training a canonicalization model according to implementations disclosed herein.

Turning to FIG. 3, an example is illustrated of training a canonicalization model 118. A canonicalization training instance 302 is retrieved from the canonicalization training instance database 122. The canonicalization training instance 302 can be generated by the canonicalization training instance engine 124 based on, for example, a pair of queries with the same intent where the first query is not well-formed and the second query is a well-formed variant of the first query. As one example, the pair of queries can include a not well-formed query of "today date" and a well-formed variant of the query of "What is today's date". As another example, the pair of queries can include a not well-formed query of "painter mona lisa" and a well-formed variant of the query of "who painted the mona lisa".

The canonicalization model training engine 120 applies the training instance input of the canonicalization training instance as input to canonicalization model 118. In some implementations, one or more linguistic features extracted from the training instance input are applied as input to canonicalization model 118. The canonicalization model training engine 120 further generates output over the canonicalization model 120 based on the applied input and the current learned parameters of the canonization model 118. The canonicalization model 120 further generates a gradient based on comparison of the generated output to the training instance output (i.e., the well-formed variant of the input query) of canonicalization training instance 302, and updates the canonicalization model 118 based on the gradient (e.g., backpropagates the gradient over the entire canonicalization model). Batch training techniques can additionally or alternatively be utilized in which the gradient is generated based on comparisons of generated outputs, for multiple training instances, to training instance outputs for the multiple training instances.

In generating the output based on the applied input, the canonicalization model training engine 120 can apply all or portions of the input (as well as linguistic features extracted from the input search query) to encoder layers 304 of the canonicalization model 118 and generate an encoding output over the encoder layers 304. The engine 120 can further apply the encoding output to the decoder layers 306 of the canonicalization model 118.

Although FIG. 3 illustrates only a single canonicalization training instance 302, it is understood that many additional training instances will be utilized in training canonicalization model 118.

Figure 4:
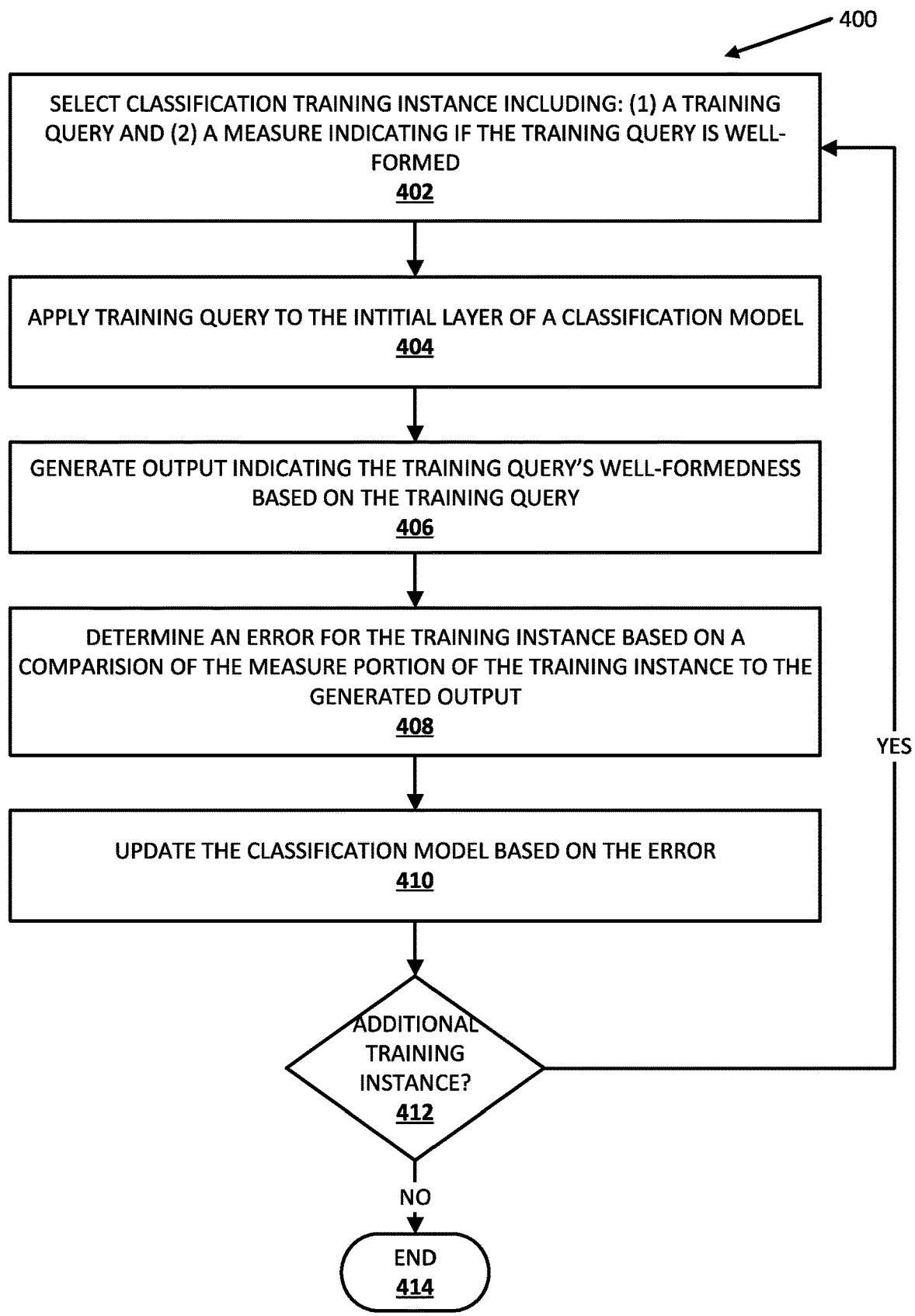
FIG. 4 is a flowchart illustrating a process of training a classification model according to implementations disclosed herein.

Turning now to FIG. 4, a flowchart is provided that illustrates a process 400 of training a classification model according to various implementations disclosed herein. For convenience, the operations of the flowchart are described with reference to a system that performs the operations. This system may include one or more components, such as one or more processors (e.g., CPU(s), GPU(s), and/or TPU(s)).

While operations of process 400 are shown in a particular order, this is not meant to be limiting. One or more operations may be reordered, omitted, and/or added.

At block 402, the system selects a classification training instance. In many implementations, a classification training instance can include a training query and a measure indicating if the training query is well-formed.

At block 404, the system applies the training query portion of the selected training instance as input to the initial layer of a classification model. In many implementations, the initial layer of the classification model is a feed-forward neural network layer.

At block 406, the system generates output indicating the training query's well-formedness based on the query portion of the classification training instance. In many implementations, the output indicating training query's well-formedness is based on the current learned parameters of the classification model.

At block 408, the system determines an error for the training instance based on a comparison of the generated output and the measure indicating if the training query is well-formed (included in the training instance).

At block 410, the system updates the classification model based on the error. For example, the error may be a gradient that is backpropagated over the classification model to update parameters of the classification model.

At block 412, the system determines whether there are any additional unprocessed training instances in the group. If so, the system proceeds to block 402 and selects an additional training instance. The system then performs blocks 404, 406, 408, 410, and 412 based on the additional training instance.

If, at an iteration of block 412, the system determines there are not any additional unprocessed training instances (and/or that other training criteria have been satisfied), the system proceeds to block 414, where the training ends.

Although FIG. 4 illustrates a particular non-batch training, it is understood that batch training (e.g., where error is determined and backpropagated based on a batch of training instances) may additionally or alternatively be utilized in training. Also, it is understood that in various implementations, a classification model trained based on process 400 may be further trained according to techniques disclosed herein.

Figure 5:
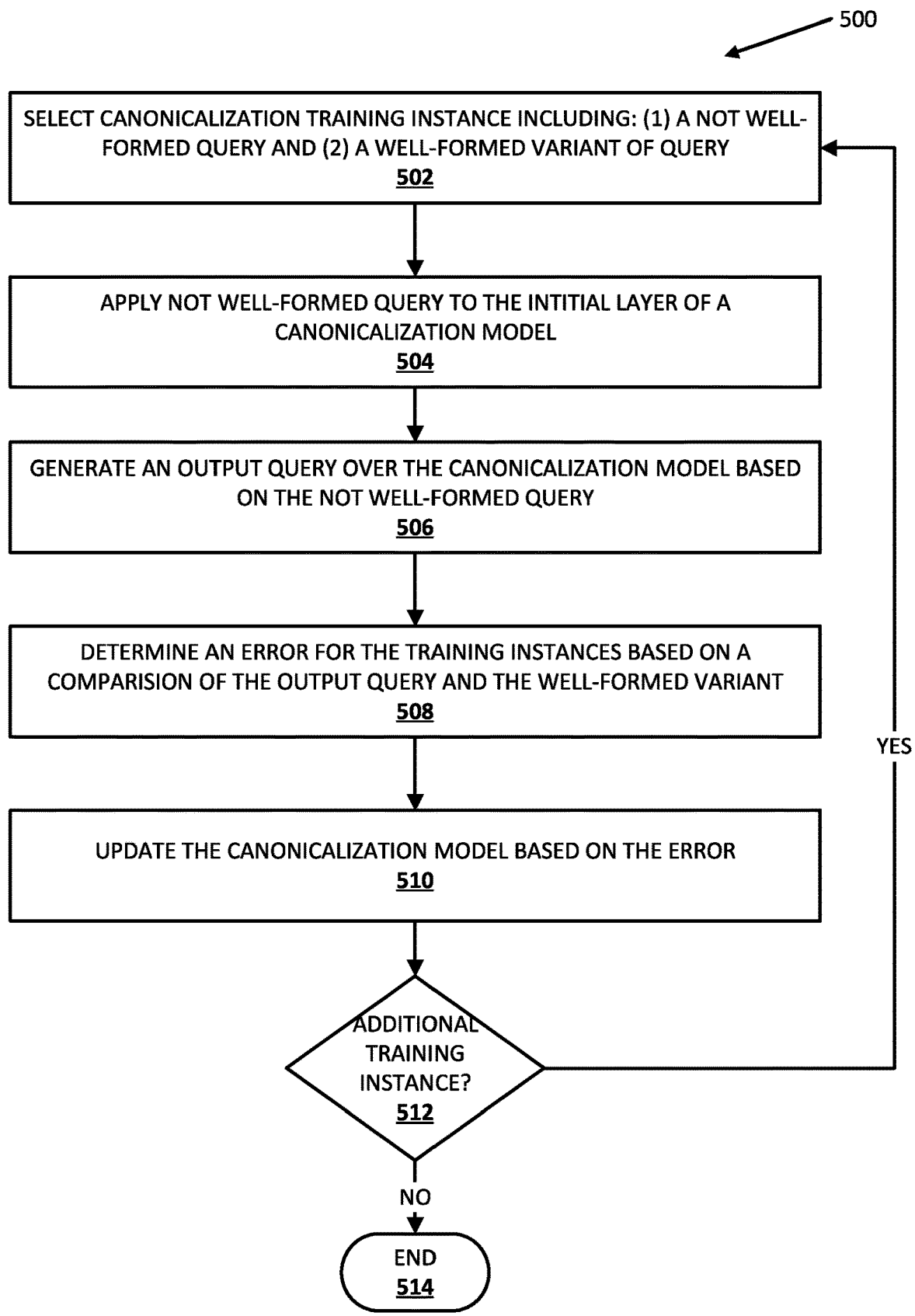
FIG. 5 is a flowchart illustrating a process of training a canonicalization model according to implementations disclosed herein.

Turning now to FIG. 5, a flowchart is provided that illustrates a process 500 of training a canonicalization model according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 500 are shown in a particular order, this is not meant to be limiting. One or more operations may be reordered, omitted, and/or added.

At block 502, the system selects a canonicalization training instance. In some implementations, a canonicalization training instance includes a pair of queries, a not well-formed query and a well-formed variant of the first query.

At block 504, the system applies the not well-formed query portion of the canonicalization training instance to the initial layer of a canonicalization model. In some implementations, one or more linguistic features extracted from the not well-formed query can be applied to the initial layer of the canonicalization model. In many implementations, the canonicalization model is a sequence to sequence model including an encoder portion followed by a decoder portion.

At block 506, the system generates an output query over the canonicalization model based on not well-formed query. In many implementations, the output query is based on the current learned parameters of the canonicalization model.

At block 508, the system determines an error for the canonicalization training instance based on a comparison of the output query and the well-formed variant portion of the training instance.

At block 510, the system updates the canonicalization model based on the error. For example, the error may be a gradient that is backpropagated over the canonicalization model to update the canonicalization model.

At block 512, the system determines whether there are any additional unprocessed training instances in the group. If so, the system proceeds back to 502 and selects an additional training instance. The system then performs blocks 504, 506, 508, 510, and 512 based on the additional training instance.

If, at an iteration of block 512, the system determines there are not any additional unprocessed training instances in the group (or that other training criteria have been satisfied), the system proceeds to block 514, where the training ends.

Although FIG. 5 illustrates a particular non-batch training, it is understood that batch training (e.g., where error is determined and backpropagated based on a batch of training instances) may additionally or alternatively be utilized in training. Also, it is understood that in various implementations, a classification model trained based on process 500 may be further trained according to techniques disclosed herein.

Figure 6:
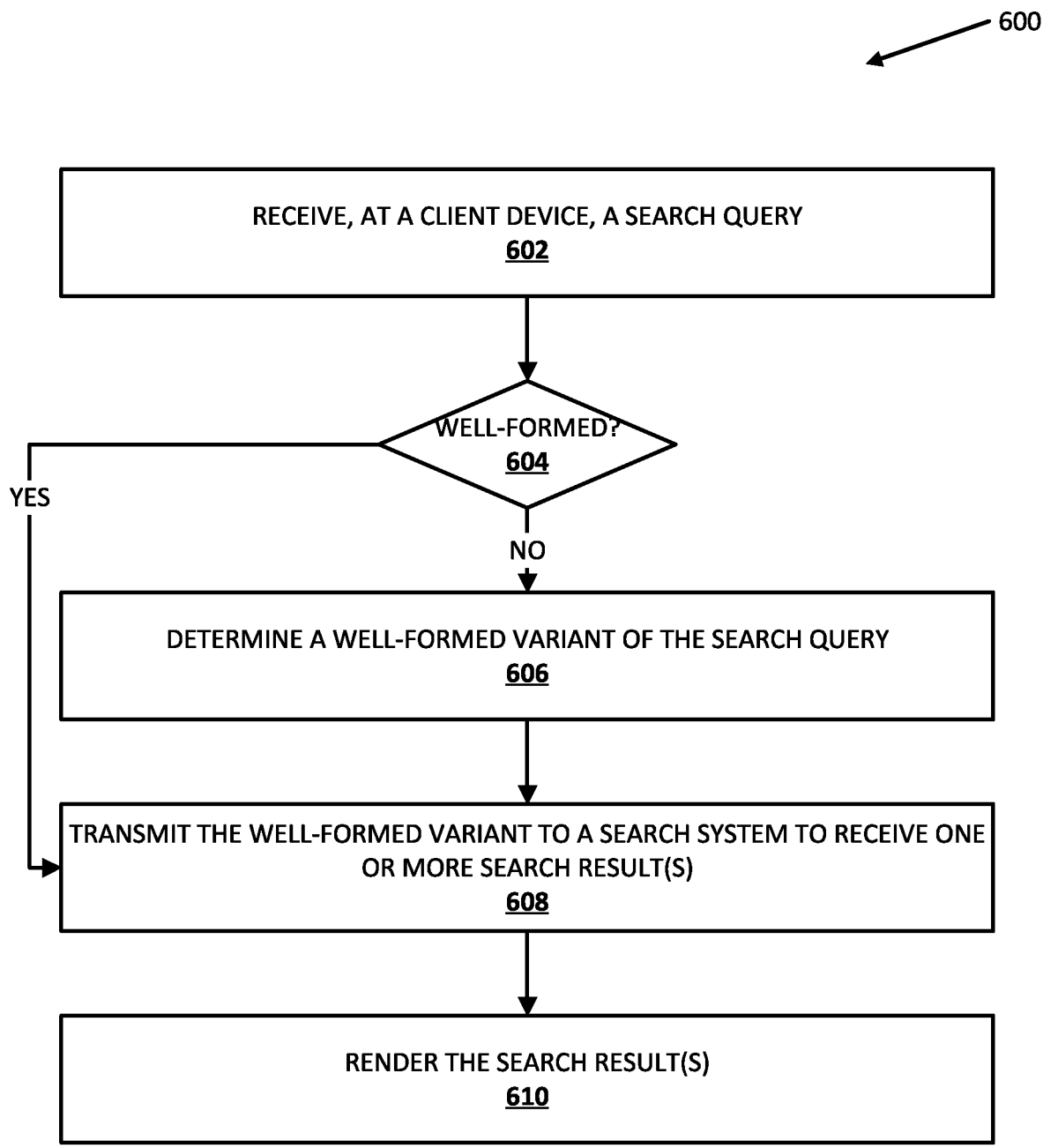
FIG. 6 is a flowchart illustrating a process of generating a well-formed query according to implementations disclosed herein.

Turning now to FIG. 6, a flowchart is provided that illustrates a process 600 of generating a well-formed variant of a search query according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 600 are shown in a particular order, this is not meant to be limiting. One or more operations may be reordered, omitted, and/or added.

At block 602, the system receives, at a client device, a search query. In various implementations, the search query is provided to the client device by a user. In many implementations, a search query can be text input. Additionally or alternatively, a search query may be audio and/or other types of input which may be converted to text by a client device (e.g., a spoken search query converted to text using a speech-to-text system of the client device).

At block 604, the system determines whether the search query is well-formed. In some such implementations, the system utilizes a trained classification model to determine if a search query is well-formed in accordance with implementations described herein. If the search query is not well-formed, the system proceeds to block 606. If the search query is well-formed, the system proceeds to block 608.

At block 606, upon determining a search query is not well-formed, the system determines a well-formed variant of the search query. In many implementations, the system utilizes a trained canonicalization model to determine the well-formed search variant of the search query.

At block 608, the system transmits the well-formed variant to a search system to receive one or more search result(s). Additionally or alternatively, if the system determines the search query is well formed at block 604, the system transmits the search query to a search system to receive one or more search result(s). In a variety of implementations, the system utilizes a search system to determine search result(s).

At block 610, the system renders the one or more search result(s). In many implementations, the search result(s) are rendered via a display, a speaker and/or an additional user interface output device of the client device.

Figure 7:
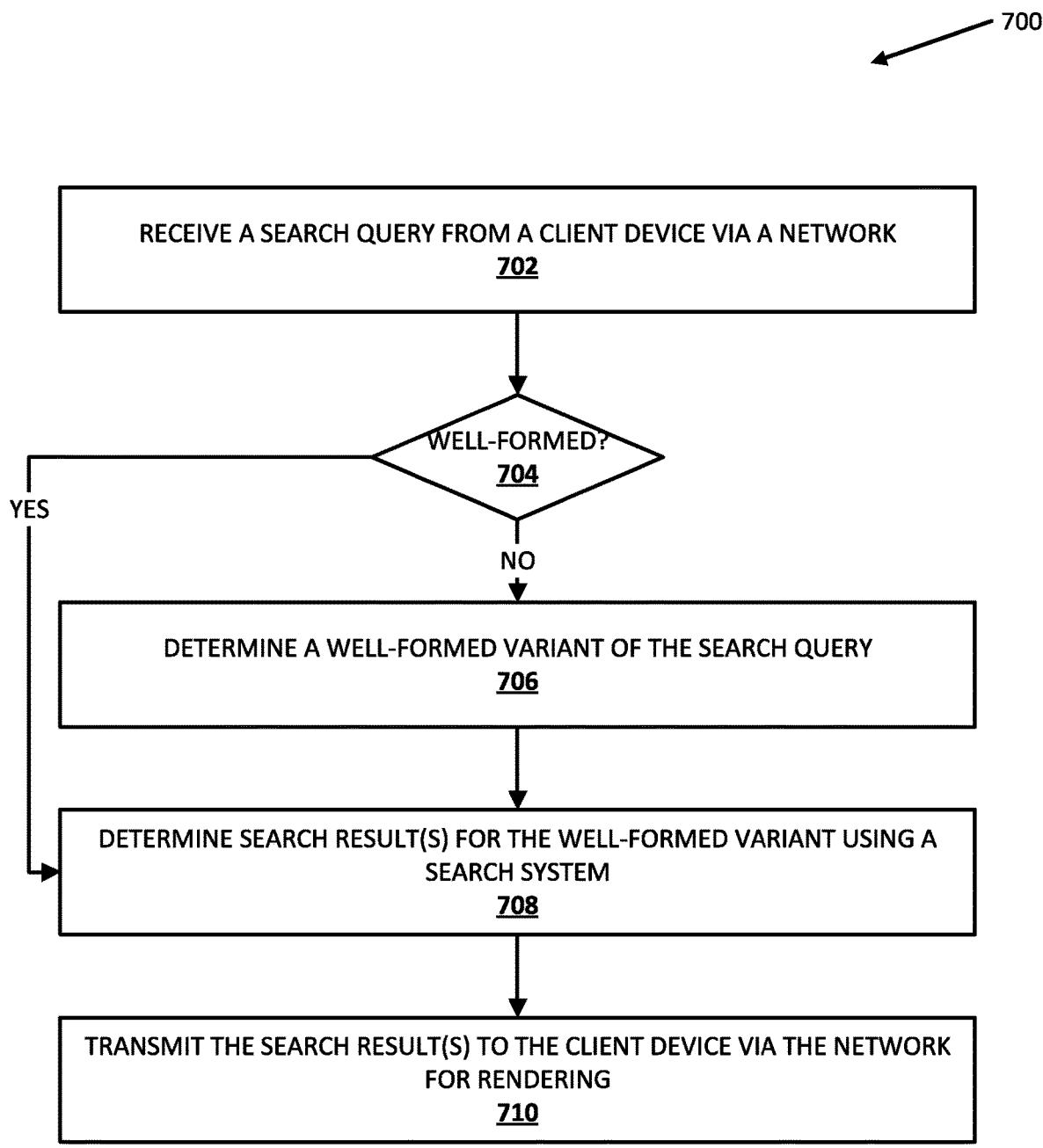
FIG. 7 is a flowchart illustrating an additional process of generating a well-formed query according to implementations disclosed herein.

Turning now to FIG. 7, a flowchart is provided that illustrates a process 700 according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 700 are shown in a particular order, this is not meant to be limiting. One or more operations may be reordered, omitted, and/or added.

At block 702, the system receives a search query from a client device via a network. In a variety of implementations, the client device is remote from the system.

At block 704, the system determines if the search query is well-formed using a classification model in accordance with implementations disclosed herein. If the system determines the search query is not well-formed, the system proceeds to block 706. Additionally or alternatively, if the system determines the search query is well-formed, the system proceeds to block 708.

At block 706, in response to determining a search query is not well-formed, the system determines a well-formed variant of the search query. In some implementations, the system utilizes a canonicalization model to determine a well-formed variant of the search query.

At block 708, the system determines one or more search result(s) using a search system for the well-formed variant of the search query. Additionally or alternatively, if at block 704 the system determines the search query is well-formed, the system determines one or more search result(s) for the search query. In many implementations, a search system determines one or more search result(s) for a query.

At block 710, the system transmits the search result(s) to the client device via the network for rendering. In many implementations, the client device renders search result(s) are rendered via a display, a speaker and/or an additional user interface output device of the client device.

While process 700 of FIG. 7 illustrates the entire query canonicalization system remote from a client device, one or more portions of the query canonicalization system may be implemented on the client device. For example, the client device can determine if a search query is well-formed using a classification model stored on the client device prior to transmitting a not well-formed query to the remote system. Additionally or alternatively, the client device can determine a query's well-formedness, and if appropriate, the well-formed variant of the search query prior to transmitting the well-formed query to the remote system (i.e., the remote system receives a well-formed query and generates one or more search results using a search system stored on the remote system).

Figure 8:
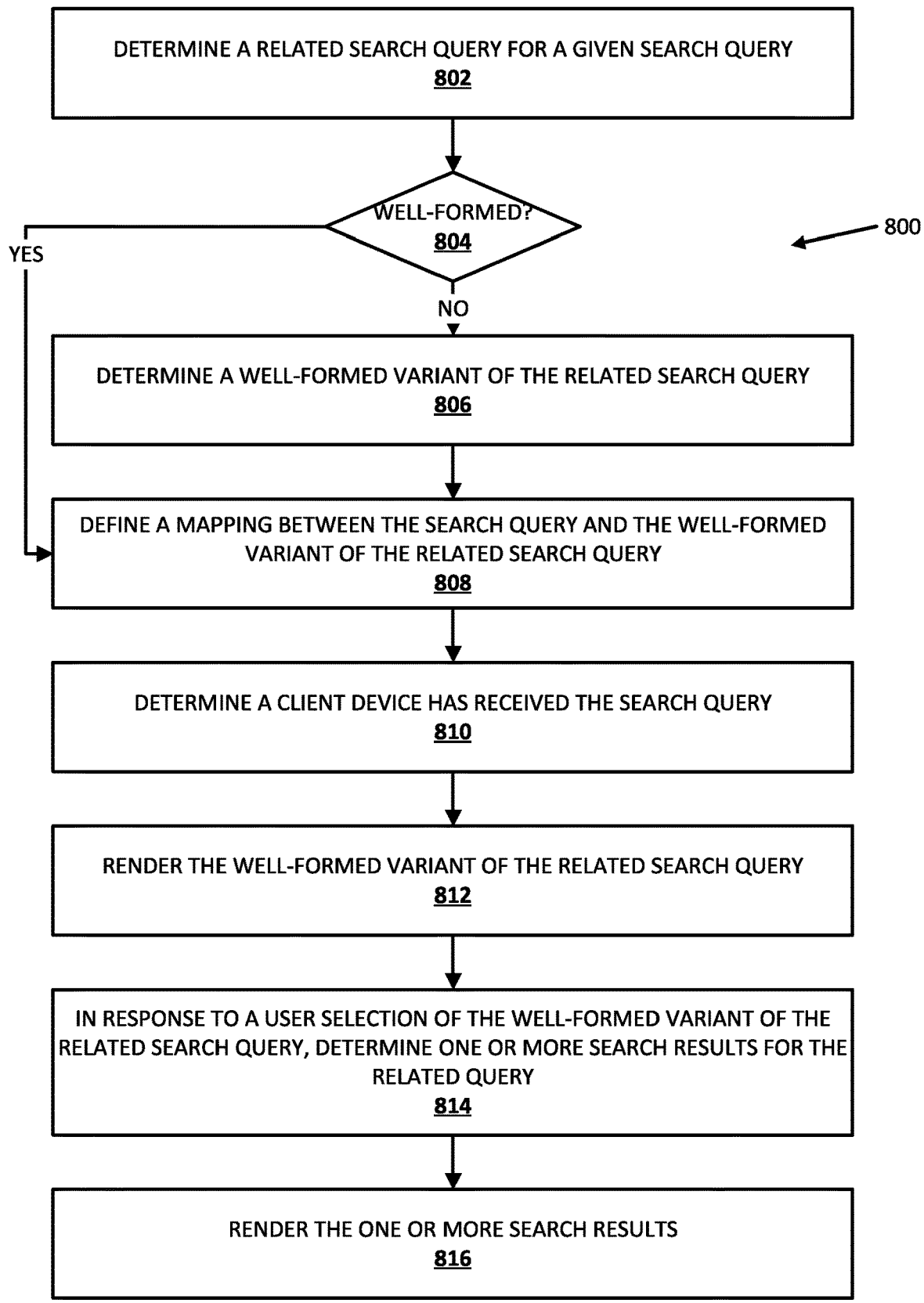
FIG. 8 is a flowchart illustrating a process in accordance with implementations disclosed herein.

Turning now to FIG. 8, a flowchart is provided that illustrates process 800 according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 800 are shown in a particular order, this is not meant to be limiting. One or more operations may be reordered, omitted, and/or added.

At block 802, the system determines a related search query for a given search query. A given search query and a related query can be associated by historical data indicating the two queries are submitted proximate (in time and/or order) to one another by a large quantity of users of a search system.

At block 804, the system determines if the related search query is well-formed using a classification model in accordance with various implementations. If the system determines the related query is not well-formed, the system proceeds to block 804. Additionally or alternatively, if the system determines the related search query is well-formed, the system proceeds to block 808.

At block 806, the system determines a well-formed variant of the related search query using a canonicalization model.

At block 808, the system defines a mapping between the search query and the well-formed variant of the search query. Additionally or alternatively, if the system determined at block 802 that the related query was well-formed, the system can define a mapping between the search query and the related query. In several implementations, the mapping between the search query and the well-formed variant of the related search query (or the mapping between the search query and the related query if the related query is well-formed) can be stored in a database.

At block 810, the system determines the client device has received the search query. In many implementations, the search query can be received as user interface input at a client device.

At block 812, the system utilizes the mapping between the search query and the related search query to determine the well-formed variant of the related search query. In many implementations, the system renders the well-formed variant of the related search query via a display, a speaker, and/or and additional user interface output device of the client device. For example, the well-formed variant of the client device can be rendered as part of a graphic user interface. Additionally or alternatively, the well-formed variant of the related search query can be rendered as a selectable version of the well-formed variant.

At block 814, in response to a user selecting the well-formed variant (e.g., clicking on a selectable link), the system can determine one or more search results corresponding to the related query. Additionally or alternatively, some systems can determine one or more search results corresponding to the well-formed variant of the related query.

At block 816, the system renders the one or more search results corresponding to the related query. In many implementations, the search result(s) can be rendered via the client device.

Figure 9B:
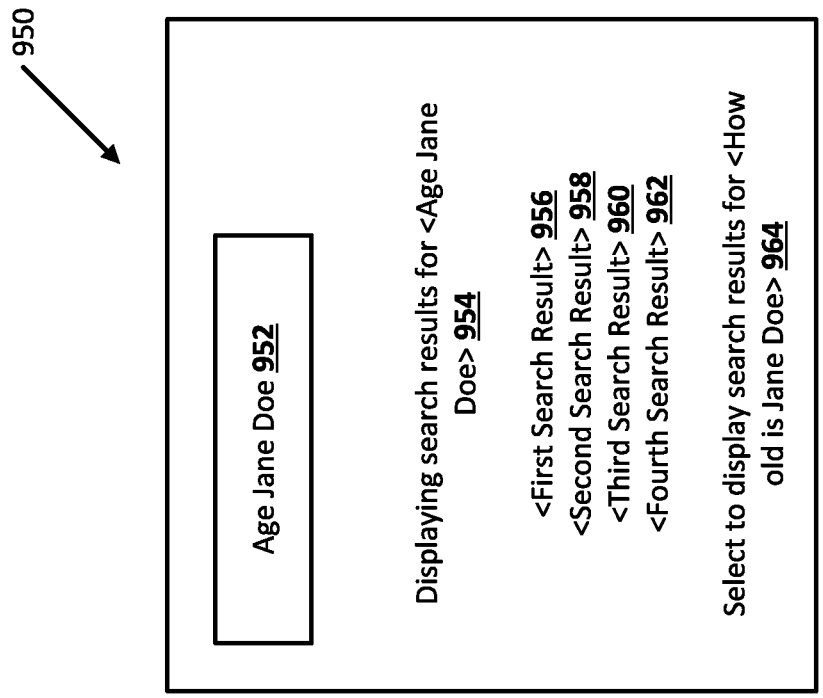
FIG. 9A, FIG. 9B, and FIG. 9C each illustrate an example graphical user interface according to implementations disclosed herein.
Figure 9A:
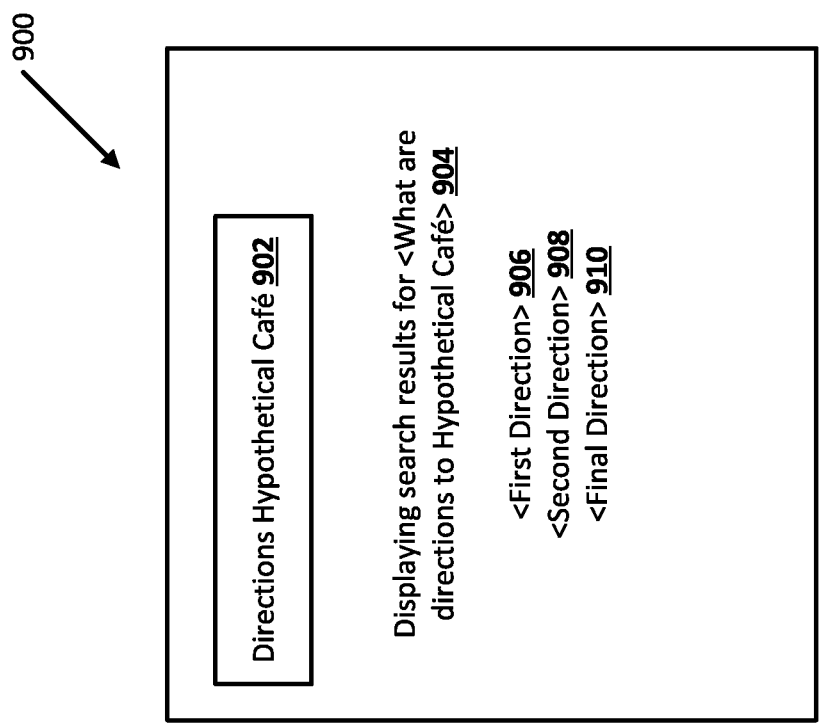
Figure 9C:
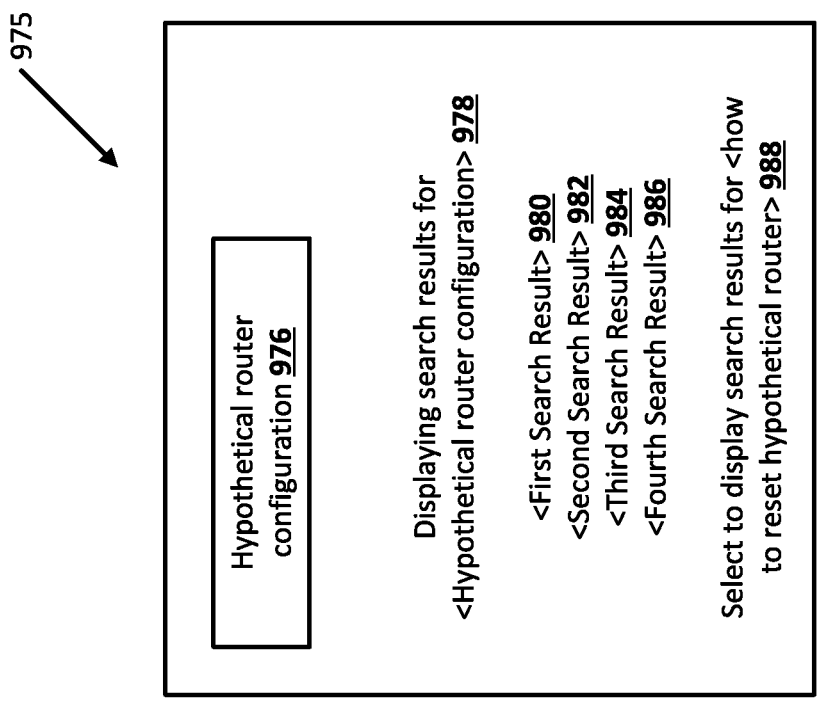

Turning now to FIG. 9A, FIG. 9B, and FIG. 9C, example graphical user interfaces 900, 950, and 975 are illustrated for providing search result output based on well-formed queries generated according to implementations disclosed herein. The graphical user interfaces 900, 950, and 975 may be presented at client device 102 (e.g., in a browser executing at client device 102 and/or in another application executing at client device 102).

In FIG. 9A, a user has provided a query 902 of "Directions Hypothetical Café" as user interface input to a client device. Search query 902 is not a well-formed query in accordance with implementations described herein because it is not an explicit question. In response, output is provided that includes a well-formed variant of the search query 904 of "What are directions to Hypothetical Café". In some implementations, the output includes search results 906, 908, 910 corresponding to the well-formed variant 904. For example, in response to search query 902 requesting directions to a location (e.g., Hypothetical Café), search results can include directions to the requested location such as "First Direction" 906, "Second Direction" 908, "Third Direction" 910 and/or additional directions to the location.

In FIG. 9B, a user has provided a search query 952 of "Age Jane Doe". Search query 952 is not a well-formed query because it is not grammatical and is not an explicit question. In many implementations, output can be rendered including message 954 of "Displaying search results for Age Jane Doe" which indicates search results for search query 952. Furthermore, search results 956, 958, 960, and 962 can be rendered. For example, search results can include "First Search Result" 956, "Second Search Result" 958, "Third Search Result" 960, "Fourth Search Result" 962, and/or additional search results. In various implementations, message 964 of "Select to display search results for <How old is Jane Doe>" can be rendered, which indicates the well-formed variant of query 952. In many implementations, message 964 is a selectable link which, and search results for the well-formed variant of 952 can be rendered in response to a user selecting the link.

Turning to FIG. 9C, a user has provided a search query 976 of "Hypothetical router configuration". Search query 976 is not a well-formed query in accordance with many implementations described herein. In a variety of implementations, output can be rendered including message 978 of "Displaying search results for <Hypothetical router configuration>". Furthermore, search results 980, 802, 904, 986 can be rendered. For example, search results can include "First Search Result" 980, "Second Search Result" 982, "Third Search Result" 984, "Fourth Search Result" 986, and/or additional search results. In a variety of implementations, message 988 of "Select to display search results for <how to reset hypothetical router>", which is a well-formed variant of the related question "reset hypothetical router" (where the system has determined "reset hypothetical router" is related to search query 976 of "Hypothetical router configuration"). Additionally or alternatively, message 988 can be a selectable link, and the system can render search results for the related question and/or the well-formed variant of the related question in response to a user selecting the link.

Figure 10:
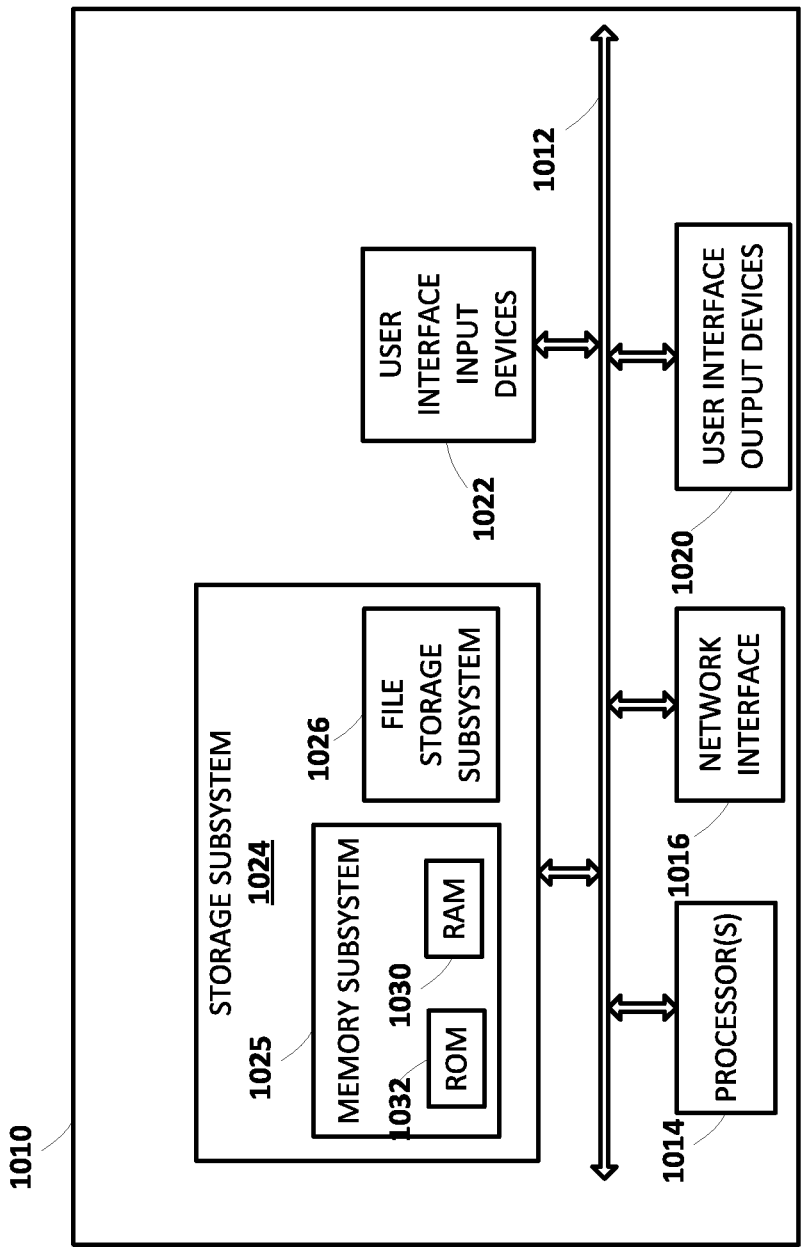
FIG. 10 illustrates an example architecture of a computing device.

FIG. 10 is a block diagram of an example computing device 1010 that may optionally be utilized to perform one or more aspects of techniques described herein. In some implementations, one or more of a client computing device, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of one or more of the processes of FIGS. 4-8, as well as to implement various components depicted in FIG. 1.

These software modules are generally executed by processor 1014 alone or in combination with other processors. Memory 1025 used in the storage subsystem 1024 can include a number of memories including a main random access memory ("RAM") 1030 for storage of instructions and data during program execution and a read only memory ("ROM") 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving a search query, the search query being a natural language search query and being generated at a client device responsive to user interface input received at the client device;
determining whether the search query is well-formed, wherein determining whether the search query is well-formed is performed prior to attempting to generate any well-formed variant for the search query, and is performed prior to a search being performed for the search query, and wherein determining whether the search query is well-formed comprises:
processing features of the search query using a trained classification model to generate classification output of the trained classification model, the trained classification model being a trained machine learning model, and the classification output comprising a probability indicating an extent to which the search query conforms to one or more grammar rules; and
determining, based on a magnitude of the probability of the classification output, whether the search query is well-formed;
in response to determining the search query is not well-formed, generating a well-formed variant of the search query, wherein generating the well-formed variant comprises:
applying features of the search query as input to an encoder portion of a trained canonicalization model to generate encoder output; and
applying the encoder output to a decoder portion of the trained canonicalization model to generate the well-formed variant of the search query;
providing the well-formed variant to a search system to generate one or more search results corresponding to the well-formed variant; and
causing, responsive to receiving the search query, the one or more search results, that correspond to the well-formed variant, to be rendered via the client device.

2. The method of claim 1, wherein determining whether the search query is well-formed comprises determining the search query is not an explicit question, and wherein the well-formed variant is grammatical and/or is an explicit question.

3. The method of claim 1, wherein the features of the search query comprise one or more of: one or more characters in the search query, one or more words in the search query, or one or more parts of speech in the search query.

4. The method of claim 1, wherein the features of the search query comprise one or more of: one or more character n-grams, one or more word n-grams, or one or more part of speech n-grams.

5. The method of claim 4, wherein applying the search query as input to the encoder portion of the trained canonicalization model comprises applying a concatenation of multiple of: the one or more character n-grams, the one or more word n-grams, or the one or more part of speech n-grams.

6. The method of claim 5, wherein processing the features of the search query of the trained classification model to generate classification output comprises applying the concatenation to a plurality of feed-forward layers of the trained classification model to generate feed-forward output.

7. The method of claim 6, wherein processing the features of the search query of the trained classification model to generate classification output further comprises applying the feed-forward output as input to a softmax layer of the trained classification model to generate the classification output.

8. The method of claim 1, wherein the magnitude of the probability is a value between zero and one.

9. The method of claim 1, wherein the trained canonicalization model is a sequence to sequence model, wherein the encoder portion of the canonicalization model is a first recurrent neural network and the decoder portion of the canonicalization model is a second recurrent neural network.

10. The method of claim 9, wherein the canonicalization model is trained by: training the canonicalization model based on a plurality of canonicalization training instances that each includes a corresponding first query which is not well-formed and a corresponding second query which is well-formed.

11. The method of claim 9, wherein the classification model is trained by: training the classification model based on a plurality of classification training instances that each includes a corresponding input query and a corresponding indication of whether the corresponding input query is well-formed.

12. The method of claim 11, wherein the search system is remote from the client device and providing the well-formed variant to the search system to generate the one or more search results corresponding to the well-formed variant comprises: transmitting the well-formed variant to the search system remote from the client device; and receiving the one or more search results from the search system remote from the client device.

13. A method implemented by one or more processors, the method comprising:
receiving a search query, the search query being a natural language search query and being generated at a client device responsive to user interface input received at the client device;
determining whether the search query is well-formed, wherein determining whether the search query is well-formed is performed prior to attempting to generate any well-formed variant for the search query, and wherein determining whether the search query is well-formed comprises:
processing features of the search query using a trained classification model to generate classification output of the trained classification model, the trained classification model being a trained machine learning model, and the classification output comprising a probability indicating an extent to which the search query conforms to one or more grammar rules; and determining, based on a magnitude of the probability of the classification output, whether the search query is well-formed;

in response to determining the search query is not-well formed, generating a well-formed variant of the search query, wherein generating the well-formed variant comprises:

applying features of the search query as input to an encoder portion of a trained canonicalization model to generate encoder output;

applying the encoder output to a decoder portion of the trained canonicalization model to generate the well-formed variant of the search query;

causing, responsive to receiving the search query, the client device to render:

an indication the search query is not well-formed, and the well-formed variant.

14. The method of claim 13, wherein causing the indication the search query is not well-formed to be rendered comprises causing the indication the search query is not well-formed to be rendered, via a display, as a selectable link.

15. The method of claim 14, further comprising: in response to receiving user interface input at the client device indicating a selection of the selectable link, providing the well-formed variant to a search system to generate one or more search results corresponding to the well-formed variant; and causing, responsive to the well-formed variant, the one or more search results to be rendered via the client device.

16. The method of claim 13, wherein the trained canonicalization model is a sequence to sequence model, wherein the encoder portion of the canonicalization model is a first recurrent neural network and the decoder portion of the trained canonicalization model is a second recurrent neural network.

17. A method implemented by one or more processors, the method comprising:

determining a related search query for a given search query;

determining whether the related search query is well-formed, wherein determining whether the related search query is well-formed comprises:

processing features of the related search query using a trained classification model to generate classification output; and determining whether the related search query is well-formed based on the classification output;

in response to determining the related search query is not well-formed, generating a well-formed variant of the related search query, wherein the well-formed variant differs from the related search query, and wherein generating the well-formed variant comprises:

applying the related search query as input to an encoder portion of a trained canonicalization model to generate the encoder output; and applying the encoder output to a decoder portion of the trained canonicalization model to generate the well-formed variant of the related search query;

defining a mapping between the given search query and the well-formed variant of the related search query;

subsequent to defining the mapping, and in response to a submission of the given search query via a client device:

determining to provide a selectable version of the well-formed variant of the related search query for presentation in response to the submission, based on the mapping being defined between the given search query and the well-formed variant; and causing, in response to the submission, the client device to visually render the selectable version of the well-formed variant; and in response to selection, via the client device, of the selectable version of the well-formed variant, providing the related search query to a search system to generate one or more corresponding search results.

18. The method of claim 17, wherein the well-formed variant of the related search query is grammatical, is an explicit question, and contains no spelling errors.

19. The method of claim 17, wherein the trained canonicalization model is a sequence to sequence model, wherein the encoder portion of the canonicalization model is a first recurrent neural network and the decoder portion of the canonicalization model is a second recurrent neural network.

20. The method of claim 1, further comprising: determining the search query contains no spelling errors; and determining the well-formed variant of the search query includes one or more words that are not included in the search query.

* * * * *